US009078062B2

(12) United States Patent
Lamb et al.

(10) Patent No.: US 9,078,062 B2
(45) Date of Patent: Jul. 7, 2015

(54) DRIVING OF PARAMETRIC LOUDSPEAKERS

(75) Inventors: William John Lamb, Eindhoven (NL); Ronaldus Maria Aarts, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 350 days.

(21) Appl. No.: 13/811,335

(22) PCT Filed: Jul. 18, 2011

(86) PCT No.: PCT/IB2011/053183
§ 371 (c)(1), (2), (4) Date: Jan. 21, 2013

(87) PCT Pub. No.: WO2012/011039
PCT Pub. Date: Jan. 26, 2012

(65) Prior Publication Data

US 2013/0121500 A1 May 16, 2013

(30) Foreign Application Priority Data

Jul. 22, 2010 (EP) .................................... 10170376

(51) Int. Cl.
*G10K 11/16* (2006.01)
*H04R 3/04* (2006.01)
*H04B 15/00* (2006.01)

(52) U.S. Cl.
CPC .............. *H04R 3/04* (2013.01); *H04R 2217/03* (2013.01); *H04R 2400/00* (2013.01)

(58) Field of Classification Search
CPC ...... H04R 2217/03; H04R 3/00; H04R 17/00; H04R 3/04; H04R 2400/00; G10K 15/02; G10K 15/04; H04S 7/303
USPC ............. 381/1, 71.1, 71.7, 71.8, 89, 92, 94.2, 381/97, 79, 77, 111, 120, 189, 103, 387
See application file for complete search history.

(56) References Cited

U.S. PATENT DOCUMENTS 6,584,205 B1 * 6/2003 Croft et al. ...................... 381/98
2004/0264707 A1 12/2004 Yang et al.

(Continued)

FOREIGN PATENT DOCUMENTS

JP 2003299180 A 10/2003
JP 2005304028 A 10/2005
WO 0115491 A1 3/2001

OTHER PUBLICATIONS

Berktay: "Possible Exploitation of Non-Linear Acoustics in Underwater Transmitting Applications"; J. Sound Vib. (1965), 2 (4), 435-461.

(Continued)

*Primary Examiner* — Vivian Chin
*Assistant Examiner* — Ammar Hamid

(57) ABSTRACT

A parametric loudspeaker system comprises a pre-compensator (305) for generating a pre-compensated envelope signal by applying a pre-compensation to the input audio signal where the pre-compensation compensates for distortion of in-air demodulation of the modulated ultrasound signal. A pre-modulator (307) generates a complex base band signal generating a phase signal from the pre-compensated envelope signal using a predetermined function for determining a phase signal from an amplitude signal such that the corresponding complex signal has either suppressed negative or positive frequencies. The complex base band signal is then generated to have an amplitude corresponding to the pre-compensated envelope signal and a phase corresponding to the phase signal. A modulator (309) quadrature modulates the complex base band signal on an ultrasonic quadrature carrier and an output circuit (311) drives the ultrasound transducer (301) from the modulated signal. The invention may allow effective yet low resource pre-compensation for a suppressed or single sideband modulated modulated ultrasound signal.

15 Claims, 3 Drawing Sheets

(56) References Cited

U.S. PATENT DOCUMENTS

| | | | |
|---|---|---|---|
| 2005/0248233 | A1 | 11/2005 | Pompei |
| 2008/0063214 | A1 | 3/2008 | Spencer et al. |

OTHER PUBLICATIONS

Chen et al: "The Distortion Analysis of the Single Side Band Method for Parametric Loudspeaker Based on Orthogonal Envelope Detection": IEEE 2nd International Symposium on Systems and Control in Aerospace and Astronautics,2008, pp. 1-5.

Lee et al: "Bandwidth-Efficient Recursive pTH-Order Equalization for Correcting Baseband Distortion in Parametric Loudspeakers"; IEEE Transactions on Audio, Speech and Language Processing, vol. 14, No. 2, Mar. 2006, pp. 706-710.

Munir et al: "Comparative Analysis of Different Distortion Reduction Techniques for Parametric Loudspeaker Based on Self-Demodulation of Amplitude Moduclated Ultrasound Waves"; Second International Conference on Electrical Engineering, Mar. 2008, pp. 1-6.

Pompei: "Sound From Ultrasound: The Parametric Array As an Audible Sound Source"; 2002, Massachusetts Institute of Technology, 132 page Document.

Powers: "The Compatibility Problem in Single-Sideband Transmisstion"; Proceedings of the IRE, 1960, pp. 1431-1435.

Tan et al: "Preprocessing Techniques for Parametric Loudspeakers"; ICALIP2008, IEEE, pp. 1204-1208.

Wang et al: "SSB Modulation of the Ultrasonic Carrier for a Parametric Loudspeaker"; 2009 International Conference on Electronic Computer Technology,pp. 669-673.

Ji et al: "Theoretical and Experimental Comparison of Amplitude Modulation Techniques for Parametric Loudspeakers": Audio Engineering Society, Convention Paper 8006, pp. 1-10.

* cited by examiner

DRIVING OF PARAMETRIC LOUDSPEAKERS

FIELD OF THE INVENTION

The invention relates to driving of parametric loudspeakers and in particular, but not exclusively, to pre-compensation for single sideband modulation of parametric loudspeakers.

BACKGROUND OF THE INVENTION

In recent years, sound provision with emphasis on spatial perception has been of increasing interest. In particular, it is in many applications desirable to produce a highly directional and narrow audio beam. For example, in virtual surround sound systems where virtual rear or side sound sources are generated from physical sound transducers positioned to the front of the user, highly directional sound beams may be reflected off walls to the side or rear of the user thereby providing the perception of virtual sound sources at these reflection points.

However, such narrow and highly directional beams may be difficult to generate from traditional audio band loudspeakers. Accordingly, an alternative approach has been proposed based on radiation of ultrasound from ultra sound transducers. Such speakers are known as parametric speakers. Essentially, a parametric loudspeaker is a device which generates audible sound through the nonlinear demodulation of a high intensity ultrasonic carrier wave modulated by an audio signal. Parametric loudspeakers are attractive for sound reproduction because they possess exceedingly high directionality at audio frequencies.

Thus, parametric loudspeakers use ultrasound transducers that can provide a highly directive sound beam. In general, the directivity (narrowness) of a loudspeaker depends on the size of the loudspeaker compared to the wavelengths. Audible sound has wavelengths ranging from a few inches to several feet, and because these wavelengths are comparable to the size of most loudspeakers, sound generally propagates omnidirectionally. However, for an ultrasound transducer, the wavelength is much smaller and accordingly it is possible to create a sound source that is much larger than the radiated wavelengths thereby resulting in the formation of a very narrow and highly directional beam.

Such a highly directional beam can e.g. be controlled much better and can e.g. accurately be directed towards a desired reflection point.

The ultrasonic signal driving the ultrasound transducer is generated by amplitude modulating an ultrasound carrier signal by an audio signal derived from the audio signal being rendered. This modulated signal is radiated from the sound transducer. The ultrasound signal is not directly perceivable by a human listener but the audio signal can automatically become audible without the need for any specific functionality, receiver or hearing device. In particular, any nonlinearity in the audio path from the transducer to the listener can act as a demodulator thereby recreating the audio signal. Such a non-linearity may occur automatically in the transmission path. In particular, the air as a transmission medium inherently exhibits a non-linear characteristic that results in the ultrasound becoming audible. Thus, the non-linear properties of the air itself can cause the audio demodulation from a high intensity ultrasound signal. In this way the ultrasonic signal may automatically be demodulated to provide the audio sound to the listener.

Examples and further description of the use of parametric loudspeakers for audio radiation may for example be found in the PhD thesis "Sound from Ultrasound: The Parametric Array as an Audible Sound Source" by F. Joseph Pompei, 2002, Massachusetts Institute of Technology.

It has been found that the nonlinear demodulation process by which sound is produced by a parametric loudspeaker unfortunately gives rise to severe nonlinear distortion of the audio signal. Several distortion reducing pre-processing schemes for parametric loudspeakers have been proposed but the efficacy of these schemes is related to compromises between efficiency, bandwidth and processing complexity.

The article "Possible exploitation of non-linear acoustic in underwater transmitting applications" by Berktay, 1965, *J. Sound Vib.,* 2(4), pages 435-461 provides an analytical far field approximation indicating that the demodulated audio signal created by the parametric effect in air is proportional to the second derivative of the square of the modulation envelope E(t), i.e.:

$$y(t) = \frac{\partial^2}{\partial t^2}(E(t)^2).$$

Conventional parametric loudspeaker systems use a simple Amplitude Modulation (AM) of the carrier signal, i.e. the transducer driving signal s(t)is typically given as:

$$s(t)=E(t)\sin(\omega_c t),$$

where $\omega_c$ is the angular frequency of the carrier signal and E(t) is the envelope of the drive signal.

In order to compensate for the non-linear distortion caused by the in-air demodulation of the ultrasonic signal, it has been proposed to pre-compensate the audio signal x(t) that is to be rendered. Specifically, it has been proposed to pre-compensate the audio signal by generating the envelope signal as:

$$E(t)=\sqrt{1+\iint mx(t)},$$

This ideal modulation envelope is given by the inverse of the nonlinear demodulation operation and since the transmitted signal must be real, the only modulation envelopes that result in an audio signal with no distortion components follow such an approach.

However, rather than use standard Double SideBand (DSB) AM modulation, it has been proposed to use Single SideBand (SSB) modulation for modulating the ultrasound carrier in parametric loudspeaker systems.

The standard modulation scheme is known as Dual Side Band (DSB) AM modulation since the amplitude modulation of the carrier frequency produces two side bands, an Upper Side Band (USB) and a Lower Side Band (LSB). These sidebands are equal in bandwidth to the modulation envelope, and contain the modulation information, as indicated in FIG. 1 which illustrates the audio spectrum 101 of the drive signal, the carrier frequency 103 and the resulting DSB AM modulated signal 105.

Under ideal conditions, AM, in combination with the ideal square root envelope pre-compensation results in a theoretically distortion free audio signal after demodulation. There are, however, several practical problems. The square root operation introduces an infinite harmonic sequence and therefore requires high bandwidth of the signal processing and in principle results in a pre-compensated signal with infinite spectrum. Indeed, in order to completely suppress all distortion components, this pre-compensated signal must be fully reproduced. Real transducers and electrical circuits are inherently band limited, preventing full reproduction of the drive signal. The consequence is potentially high levels of distortion. To reduce distortion either the modulation depth can be reduced or the bandwidth of the transducer and driving electronics must be made as wide as possible.

Reducing the modulation depth reduces the efficiency of the sound reproduction, with only modest reductions in distortion. Increasing the bandwidth of the transducer and driving electronics requires highly specialized equipment, rapidly increasing hardware costs. Further there are additional limits placed on the maximum permissible bandwidth of the signal. If the bandwidth is too large, the LSB information can leak into the audible frequency range. Not only would these audible components be annoying, but the Sound Pressure Levels (SPL) may be enough to cause permanent harm to the auditory system. All audible components of the LSB must therefore be removed by a filtering operation. This requirement places a hard limit on the available bandwidth, and restricts the distortion performance of the device. Also, subjective effects, such as headaches, nausea, excessive tiredness and a sense of fullness of the ears are linked with exposure to high frequency audible sound, and high intensity ultrasound in the near audible range. LSB components near the audible range may induce these unwanted symptoms, and a device designed for use over extended periods should make additional provisions for this. This again requires truncation of the pre-processed signal, further reducing the effectiveness of the distortion reduction.

In order to address such issues, it has been proposed to use a Single SideBand (SSB) AM modulation scheme to modulate the ultrasonic carrier rather than the conventional DSB AM modulation. SSB modulation schemes remove either the LSB or USB through use of a second orthogonal carrier wave. Modulation using such orthogonal carriers is known as quadrature modulation and may be represented as the modulation in the complex domain. As illustrated in FIG. 2, SSB may be similar to DSB modulation except that only one of the sideband signals is generated, in the example the USB 201.

SSB modulation promises many advantages over DSB modulation. The removal of the lower sideband prevents modulation information from leaking into the audible frequency region, and there is no hard limit on the permissible bandwidth. As there are no signal components near the audible frequency range, the carrier frequency can be lowered, reducing the atmospheric absorption of the ultrasonic energy which boosts the efficiency of the audio signal generation. In addition, the approach may ensure that there is no high intensity ultrasound in the near audible range and may thus provide increased safety and reduced subjective effects. Transmitting one sideband can reduce the bandwidth requirements of the transducer and driving electronics resulting in simpler, cheaper hardware. Reducing bandwidth can also result in savings in terms of electrical power.

However, while SSB may provide many advantages compared to SSB when modulating ultrasound signals for parametric loudspeakers, there are also some associated disadvantages. In particular, pre-compensation approaches used for DSB cannot directly be used for SSB.

Conventional SSB systems use the following modulation scheme $$s(t)=g(t)\sin(\omega_c t)+\hat{g}(t)\cos(\omega_c t),$$

where s(t) is the transducer driving signal, g(t) is the modulation signal ĝ(t) is the Hilbert transformed modulation signal and $\omega_c$ is the angular frequency of the carrier signal.

The envelope function of s(t) is given by $$|s(t)|=\sqrt{g^2(t)+(\hat{g}(t))^2}.$$

To provide distortion free audio it is necessary to find a signal g(t) such that $$\sqrt{g^2(t)+(\hat{g}(t))^2}=E(t)=\sqrt{1+\iint mx(t)}$$

Thus, for a given audio signal x(t) it is necessary to solve this equation in order to find a function g(t) that can be used to modulate the ultrasonic signal such that the in-air demodulation of the radiated modulated ultrasound signal results in the original audio signal x(t).

However, due to the complex relationship expressed by the function, and the complex and non-linear nature of the Hilbert transform and the square-root function, this is very complicated. U.S. Pat. No. 6,584,205 and the article Lee, K., & Gan, W. "Bandwidth-efficient recursive pth-order equalization for correction based distortion in parametric loudspeakers", 2006, IEEE Trans. Audio. Speech and Lang. Proc., 14(2), 706-710 propose the use of an iterative pre-processing to slowly converge to an optimum value of g(t).

The proposed approaches involve iteratively adjusting the modulation signal g(t) until the SSB envelope function approximates the ideal envelope E(t). However, while such an approach is effective at reducing distortion levels, the iterative method is very computationally demanding and introduces significant delay into the audio chain. This requires a very significant amount of processing to implement in real time making it very costly. Indeed, U.S. Pat. No. 6,584,205 suggests that at least 8 iterations are needed for reasonable audio quality. The high processing power demanded by such an approach tends to make real time implementations very costly or impractical.

Although slightly different modulation approaches have been proposed, such as using e.g.:

$$s(t)=(1+g(t))\sin(\omega_c t)+\hat{g}(t)\cos(\omega_c t)$$

these approaches tend to suffer from the exact same problems.

It has been proposed to use simple relationships for determining the modulating function, such as e.g. g(t)=E(t). However, such simplifications tend to provide poor pre-compensation and thus result in high levels of distortion and low audio quality.

Hence, an improved approach would be advantageous and in particular an approach allowing increased flexibility, reduced complexity, facilitated implementation, reduced computational resource compensation, improved pre-compensation, improved audio quality and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for generating a drive signal for a parametric loudspeaker, the driver comprising: a receiver for receiving an input audio signal; a pre-compensator for generating a pre-compensated envelope signal by applying a pre-compensation to the input audio signal, the pre-compensation at least partially compensating an envelope distortion of in-air demodulation of a modulated ultrasonic signal; a first circuit for generating a complex base band signal, the first circuit being arranged to: generate a phase signal from the pre-compensated envelope signal in response to a predetermined function for determining a phase signal from an amplitude signal, the predetermined function generating a phase signal corresponding to a complex signal wherein a first frequency range of a first group consisting of a first range corresponding to positive frequencies and a second range corresponding to negative frequencies is suppressed relative to the other frequency range of the first group; and generate the complex base band signal with an amplitude corresponding to the pre-compensated envelope signal and a phase corresponding to the phase signal; a modulator for quadrature modulating the complex base band signal on an ultrasonic quadrature carrier to generate a modulated signal; and an output circuit for driving an ultrasound transducer from the modulated signal.

The invention may provide an improved driving of a parametric loudspeaker. An improved audio quality may be achieved in many scenarios and applications. The approach may facilitate implementation and/or operation and may in particular reduce the computational resource requirements.

The approach may provide an improved distortion reduction pre-processing scheme for a parametric loudspeaker. The distortion reduction may be particularly suited for single sideband or suppressed sideband modulation of a parametric loudspeaker thereby allowing the advantages of such modulation schemes being applied without necessitating substantially increased computational resource usage or degraded audio quality. In particular, the approach may in many embodiments avoid the need to perform iterative approximations and/or for approximating, calculating or otherwise determining inverse Hilbert transform functions and/or inverse square root functions.

The approach may indeed in many scenarios allow almost theoretically perfect distortion suppression, according to the Berktay formula, and minimum bandwidth requirements while only having modest processing demands.

The suppression may either be of negative frequencies relative to positive frequencies or of positive frequencies relative to negative frequencies. In some scenarios, either the positive or negative frequencies may be removed corresponding to a single sideband modulation.

The envelope distortion of in-air demodulation of a modulated ultrasound signal (also sometimes referred to as a parametric signal) may specifically be a default, nominal, measured, theoretical or assumed distortion associated with in-air demodulation of an audio band modulated ultrasound signal. Specifically, the envelope distortion of in-air demodulation of a modulated ultrasound signal may correspond to the theoretical distortion given substantially by:

$$y(t) = \frac{\partial^2}{\partial t^2}(E(t)^2).$$

where E(t) is the modulation envelope.

In accordance with an optional feature of the invention, the first circuit comprises a Hilbert filter.

This may allow a particularly suitable predetermined function to be applied which may result in a suppressed sideband yet allow low complexity and low computational resource determination. The Hilbert filter may specifically be a filter that approximates or implements a Hilbert transform.

In accordance with an optional feature of the invention, the first circuit comprises a circuit for applying a logarithmic function to the pre-compensated envelope signal prior to the Hilbert filter.

This may allow a particularly suitable predetermined function to be applied which may result in a suppressed sideband yet allow low complexity and low computational resource determination. The logarithmic function may specifically be a natural algorithm and may be an approximation to the theoretical logarithm.

In accordance with an optional feature of the invention, the first circuit is arranged to determine the phase signal substantially as:

$$\phi(t)=H(ln(E(t))$$

where ln(x) is the natural logarithm of x, H(x) is the Hilbert transform, E(t) is the pre-compensated envelope signal and t is a time variable.

This may allow a particularly suitable predetermined function to be applied which may result in a suppressed sideband yet allow low complexity and low computational resource determination. The logarithmic function may specifically be a natural algorithm and may be an approximation to the theoretical logarithm. In some embodiments, the natural logarithm may be generated from logarithms having other bases, i.e. from the consideration that $\log_a(x)=\log_b(x)/\log_b(a)$ and specifically $\ln(x)=\log_b(x)/\log_b(e)$.

In accordance with an optional feature of the invention, the first frequency range is the first range corresponding to negative frequencies.

The suppression may in many embodiments advantageously be of negative frequencies relative to positive frequencies. This may result in a suppressed (or removed) LSB of the modulated ultrasound signal. The feature may for example reduce the amount of modulated ultrasound in the audio band and may thus reduce the therewith associated disadvantages.

In accordance with an optional feature of the invention, the first frequency range is the second range corresponding to positive frequencies.

The suppression may in many embodiments advantageously be of positive frequencies relative to negative frequencies. This may result in a suppressed (or removed) USB of the modulated ultrasound signal. The feature may for example be advantageous in embodiments wherein the ultrasound carrier frequency is close to an upper frequency limit of the sound transducer.

In accordance with an optional feature of the invention, no less than 90% of an energy of the complex base band is in the other frequency range.

This may provide advantageous performance in many embodiments. In some embodiments, the suppressed sideband may be substantially completely removed. In some embodiments, the first frequency range may be attenuated by at least 10 dB relative to the other frequency range for absolute frequency values above 100 Hz.

In accordance with an optional feature of the invention, the pre-compensator comprises a double integrator for compensating the input audio signal.

This may provide improved performance in many embodiments. In particular, it may allow a pre-compensation which does not only correspond closely to the distortion introduced by in-air demodulation of modulated ultrasound signals but which also closely reflects the introduced pre-compensation and the relationship to suppressed (or single) sideband modulation.

In accordance with an optional feature of the invention, the double integrator corresponds to a low pass filter having a 3 dB cut off frequency in a frequency interval from 200 Hz to 2 kHz.

This may facilitate implementation and improve performance. In particular, it may reduce the required energy level of the radiated ultra-sound while still providing effective pre-distortion. In some embodiments, at least one of the lower and upper interval ends may advantageously be 400 Hz, 800 Hz, 1 kHz; or 1.5 kHz.

In accordance with an optional feature of the invention, the pre-compensator further comprises: an offset generator for applying an offset to an output of the double integrator to generate an offset signal; and a modifier for generating the pre-compensated envelope signal by applying a square root function to the offset signal.

This may allow improved performance while maintaining easy implementation. In particular it may provide a real and positive pre-compensated envelope signal. The offset may be a DC offset.

In accordance with an optional feature of the invention, the offset generator is arranged to dynamically determine the offset in response to a signal level for the input audio signal.

This may allow improved performance. In particular it may reduce the average ultrasound signal level while ensuring that the pre-compensated envelope signal is real and positive for all input signals. The offset may specifically be determined in response to an envelope of the input audio signal.

In accordance with an optional feature of the invention, the pre-compensator is arranged to restrict the pre-compensated envelope signal to have a signal value above a minimum value.

This may allow improved performance and may in particular allow the predetermined function to be well behaved and/or simpler to implement.

In accordance with an optional feature of the invention, the pre-compensator, the first circuit and the modulator are implemented as digital signal processing and the output circuit comprises a digital-to-analog converter.

This may facilitate implementation in many embodiments and may in particular allow a reduced conversion rate for the digital-to-analog converter thereby reducing cost. The approach may allow an efficient implementation with signal processing at a relatively low sample rate. In many embodiments, the sample rate may advantageously be no more than 300 kHz or even advantageously 200 kHz in some embodiments.

In accordance with an optional feature of the invention, parametric loudspeaker system comprising: a receiver for receiving an input audio signal; a pre-compensator for generating a pre-compensated envelope signal by applying a pre-compensation to the input audio signal, the pre-compensation at least partially compensating an envelope distortion of in-air demodulation of a modulated ultrasound signal; a first circuit for generating a complex base band signal, the first circuit being arranged to: generate a phase signal from the pre-compensated envelope signal in response to a predetermined function for determining a phase signal from an amplitude signal, the predetermined function generating a phase signal corresponding to a complex signal wherein a first frequency range of a first group consisting of a first range corresponding to positive frequencies and a second range corresponding to negative frequencies is suppressed relative to the other frequency range of the first group; and generate the complex base band signal with an amplitude corresponding to the pre-compensated envelope signal and a phase corresponding to the phase signal; a modulator for quadrature modulating the complex base band signal on an ultrasonic quadrature carrier to generate a modulated signal; and an output circuit for driving an ultrasound transducer from the modulated signal; and the ultrasound transducer.

According to an aspect of the invention there is provided a method of driving a parametric loudspeaker, the method comprising: receiving an input audio signal; generating a pre-compensated envelope signal by applying a pre-compensation to the input audio signal, the pre-compensation at least partially compensating an envelope distortion of in-air demodulation of a modulated ultrasound signal; generating a complex base band signal by: generating a phase signal from the pre-compensated envelope signal in response to a predetermined function for determining a phase signal from an amplitude signal, the predetermined function generating a phase signal corresponding to a complex signal wherein a first frequency range of a first group consisting of a first range corresponding to positive frequencies and a second range corresponding to negative frequencies is suppressed relative to the other frequency range of the first group; and generating the complex base band signal with an amplitude corresponding to the pre-compensated envelope signal and a phase corresponding to the phase signal; quadrature modulating the complex base band signal on an ultrasonic quadrature carrier to generate a modulated signal; and driving an ultrasound transducer from the modulated signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a parametric loudspeaker device using a Single SideBand (SSB) Amplitude Modulation (AM) of an ultrasonic carrier. However, it will be appreciated that the described principles and approaches are equally applicable to suppressed sideband AM modulation.

Figure 1:
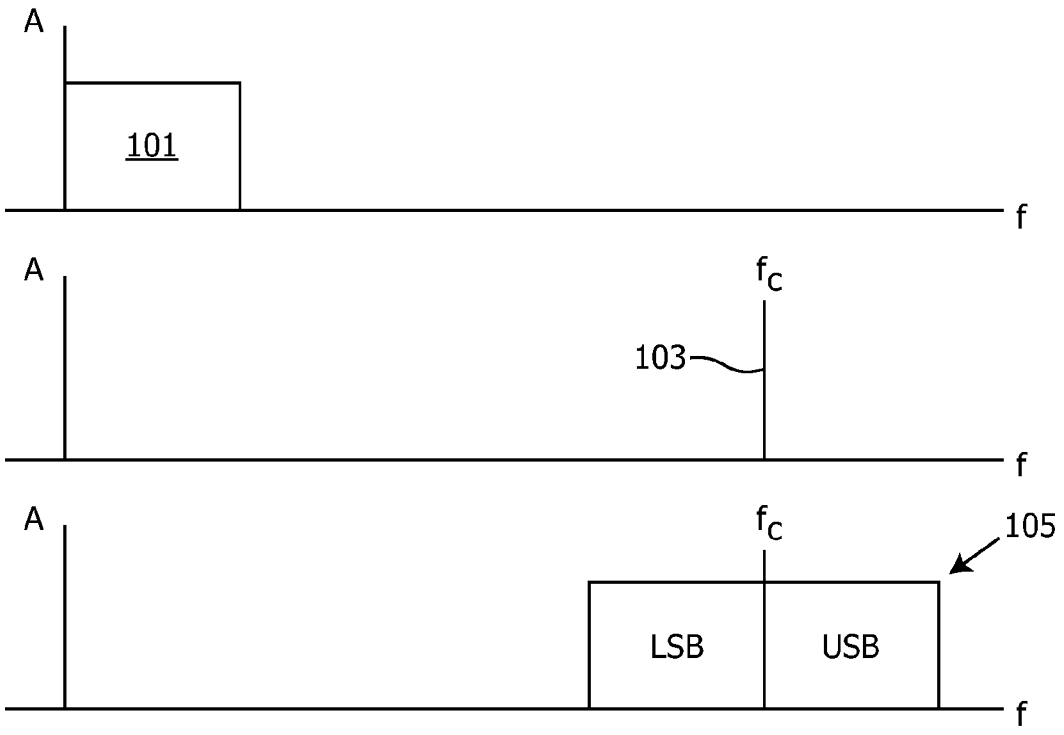
FIG. 1 is an illustration of a Double SideBand modulation scheme.
Figure 2:
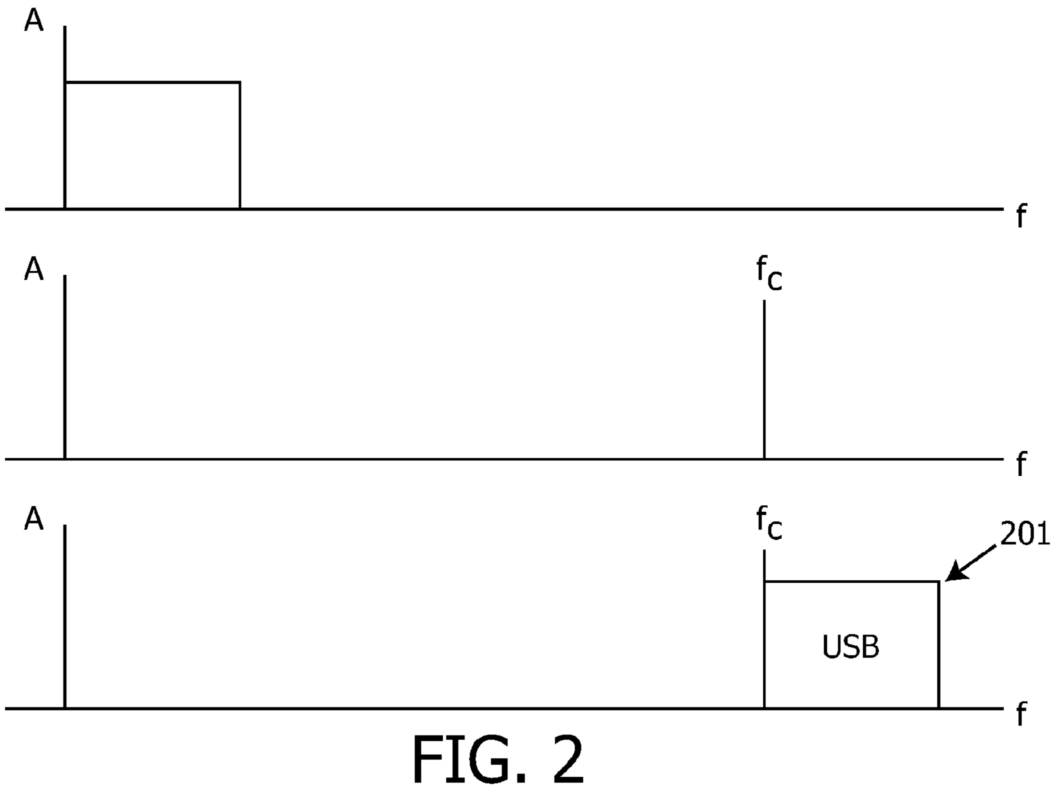
FIG. 2 is an illustration of a Single SideBand modulation scheme.
Figure 3:
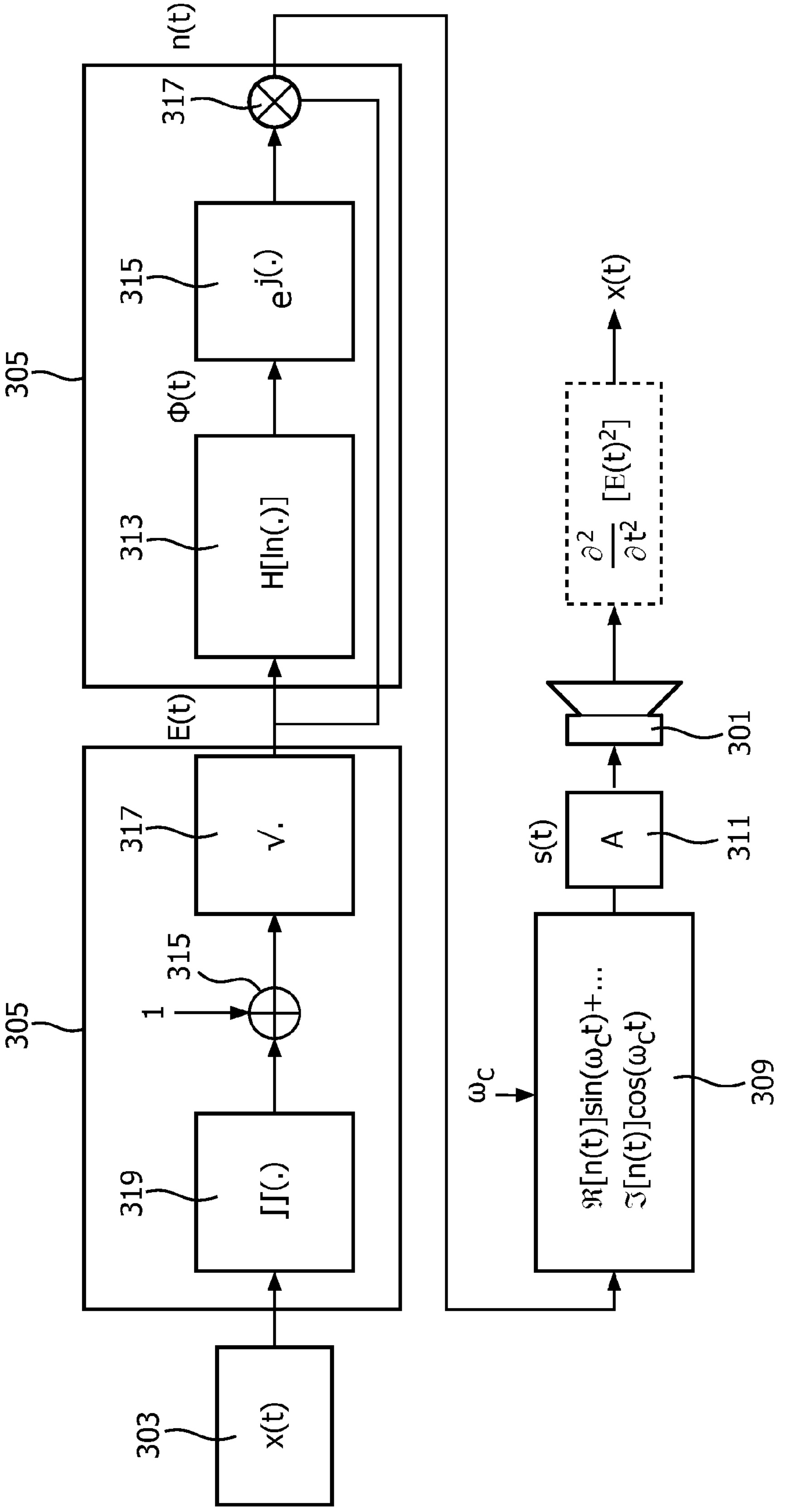
FIG. 3 illustrates an example of elements of a parametric loudspeaker system in accordance with some embodiments of the invention.

FIG. 3 illustrates an example of a parametric loudspeaker system in accordance with some embodiments. The system comprises an ultrasound transducer 301 which radiates a modulated ultrasound signal. The ultrasound signal is modulated by an audio signal such that the consequential in-air demodulation of the ultrasound signal results in reproduction of audio.

The parametric loudspeaker system comprises an input circuit 303 which receives the signal x(t) to be reproduced as sound from any suitable internal or external source. The in-air demodulation of an ultrasonic signal results in an audio signal which is a distortion of the envelope of the ultrasonic signal. In order to compensate for this distortion, the audio signal to be reproduced x(t) is not directly used to modulate the ultrasound carrier. Rather, the input circuit 303 is coupled to a pre-compensator 305 which generates a pre-compensated envelope signal E(t) by applying a pre-compensation to the input audio signal. The pre-compensation compensates for the envelope distortion that happens as a consequence of in-air demodulation of a modulated ultrasound signal.

In the example of FIG. 3, the system uses SSB modulation and therefore the real valued envelope signal is translated into a complex baseband signal by a sideband suppressor 307. In the example, the sideband suppressor 307 removes either the negative or positive frequencies of the pre-compensated envelope signal E(t) but it will be appreciated that in other embodiments the sideband suppressor 307 may only suppress either the negative frequencies or the positive frequencies. Thus, whereas the pre-compensated envelope signal E(t) is a real valued signal, and accordingly has symmetric positive and negative frequencies, the generated complex base band signal has either suppressed (or removed) positive frequencies or negative frequencies. Such an asymmetric frequency spectrum requires the signal to be complex.

In the example, the sideband suppressor 307 does not use the conventional approach of generating the complex signal by generating the imaginary part of the complex baseband signal by applying a Hilbert transform to the signal that is used as the real part of the complex signal.

Rather the sideband suppressor 307 maintains the amplitude of the complex base band signal n(t) and proceeds to generate an appropriate phase for the complex base band signal n(t) that for the specific pre-compensated envelope signal E(t) will result in a suppression (and specifically removal) of either the positive or negative frequencies. The complex base band signal n(t) is then generated simply as the complex signal that has an amplitude equal to the pre-compensated envelope signal E(t) and a phase equal to the determined phase value. Thus, the complex base band signal is generated in the phase domain rather than by an amplitude domain application of a Hilbert transform.

Specifically the complex base band signal n(t) may be generated as:

$$n(t)=E(t)\exp(j\phi(t)),$$

where ϕ(t) is the phase signal.

The sideband suppressor 307 is thus arranged to generate a phase signal from the pre-compensated envelope signal E(t) and then to generate the complex base band signal n(t) to have an amplitude corresponding to the pre-compensated envelope signal E(t) and a phase corresponding to the phase signal. The phase is determined from a predetermined function that relates envelope signals to phase signals. Thus, a low complexity function is applied to the pre-compensated envelope signal E(t) to generate the appropriate phase. The predetermined function is generated such that the phase value corresponds to values that will result in a suppression of either the positive frequencies or negative frequencies for the specific audio signal.

In some embodiments the predetermined function may for example have been determined by a training process. For example, using a simple trial and error approach, various input signals may be fed to the system with the resulting demodulated audio signal being captured. Various parameters and characteristics of the predetermined function may iteratively have been adjusted until the distortion has been reduced to a reasonable level. Since such a training process is only needed once during the design phase (and can then be reused for all systems), the training process may be an exhaustive and complex process and may involve manually fine tuning the function to provide a reasonable trade-off between distortion performance, sideband suppression performance, complexity etc.

In some embodiments, the same predetermined function may be used for all audio signals or audio segments. However, in other embodiments, the predetermined function may comprise a plurality of different sub-functions optimized for different types of audio signals or segments. The sideband suppressor 307 may in this case evaluate the received pre-compensated envelope signal E(t) to decide which sub-function to apply.

The sideband suppressor 307 is coupled to a modulator 309 which is fed the complex base band signal n(t) and which proceeds to quadrature modulate the complex base band signal on an ultrasonic quadrature carrier to generate a modulated signal. The quadrature modulation may specifically perform the function:

$$s(t)=\Re(n(t))\sin(\omega_c t)+\Im(n(t))\cos(\omega_c t)$$

The modulator 309 is coupled to an output circuit 311 which is further coupled to the ultrasound transducer 301. The output circuit 311 is arranged to drive the ultrasound transducer 310 with the modulated signal. Specifically, the output circuit 311 may comprise suitable amplifiers, filters etc as will be known to the skilled person.

Thus, the inventors have realized that it is possible to suppress a sideband by determining a suitable phase and maintaining the same amplitude as the pre-compensated envelope signal E(t). Further, the inventors have realized that by using such an approach of suppressed or single sideband modulation, the effect of the sideband suppression/removal allows the pre-compensation for such suppressed sideband modulation to directly correspond to the distortion of the in-air demodulation without needing to consider any impact of the modulation process itself This allows for a much lower complexity scheme and provides a much less computational resource demanding system than known from prior art. Indeed, the recursive implementations of the prior art can be avoided and often an order of magnitude reduction in computational resource can be achieved. Hence a much more efficient system can be achieved which furthermore typically provides improved distortion compensation and thus results in higher audio quality.

In some embodiments, either the positive or negative frequencies may be substantially removed corresponding to an SSB AM modulation. However, in some embodiments some residue of the suppressed frequencies may remain. For example, in some embodiments, the predetermined function and/or the implementation may result in some of the suppressed frequencies remaining in the complex base band signal n(t). However, in many embodiments, the suppression is advantageously such that at least 90% of the energy of the complex base band signal n(t) is in the selected one of the positive and negative frequencies (and thus in the selected sideband). In many embodiments, the suppressed frequencies may be attenuated by at least 10 dB relative to the corresponding non-suppressed frequencies, at least for absolute frequency values above 100 Hz.

In the specific example, the sideband suppressor 307 comprises a phase generator 313 which generates the phase signal ϕ(t) from the pre-compensated envelope signal E(t) by applying the predetermined function. The resultant phase signal is fed to a complex value generator 315 which generates a complex value signal with a phase corresponding to the phase signal ϕ(t) and a fixed unity amplitude. The complex value generator 315 is coupled to a multiplier 317 which multiplies the complex value signal by the pre-compensated envelope signal E(t) to create the complex base band signal n(t). Thus, the sideband suppressor 307 generates the complex base band signal n(t) as:

$$n(t)=E(t)\exp(j\phi(t)).$$

In the example, the phase generator 313 is arranged to apply a predetermined function that includes a Hilbert transform of a natural logarithm of the pre-compensated envelope signal E(t).

Figure 4:
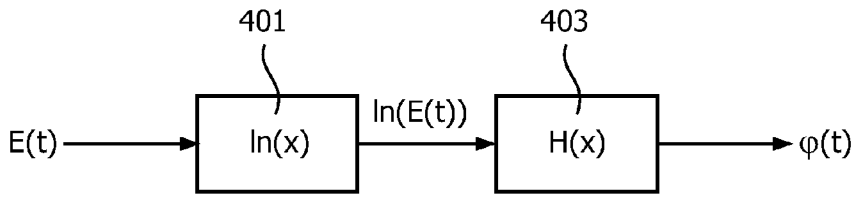
FIG. 4 illustrates an example of elements of a pre-modulator for a parametric loudspeaker system in accordance with some embodiments of the invention.

FIG. 4 illustrates an example of the phase generator 313. In the example, the pre-compensated envelope signal E(t) is fed to a log circuit 401 which applies a logarithm to the pre-compensated envelope signal E(t). The logarithm is specifically the natural logarithm. The log circuit 401 may for example be implemented as a look-up-table or may be a firmware implementation e.g. be implemented using a known subroutine for taking the natural logarithm of a value. The resulting signal is fed to a Hilbert filter 403 which applies a Hilbert transform to the signal from the log circuit 401. The Hilbert filter may specifically be implemented as an FIR or IIR filter as will be known to the skilled person.

Thus, in the example the sideband suppressor 307 generates the phase signal substantially as:

$$\phi(t)=H(ln(E(t))$$

where ln(x) is the natural logarithm of x, and H(x) is the Hilbert transform.

It can be shown that this relationship may be used to remove negative frequencies and thus can be used to provide a suitable complex base band signal to result in an SSB modulation.

Indeed, it has been shown in the article "The Compatibility Problem in Single Sideband Transmission" by Powers, K. H. Proc. of the IRE , 1960, pages 1431-1435 that the function may provide a signal with a removed sideband. The article is in the different field of radio transmissions which uses very different approaches. In particular, for radio communication, demodulation is provided by dedicated circuitry and the use of active signal processing for demodulation of signals. Indeed, the typical demodulation for radio signals uses linear envelope detectors, which are incompatible with the approach of the article. However, the Inventors have realized that the function may be used in the different field of parametric loudspeakers, and indeed can be applied to the different concept of natural demodulation of ultrasonic sound in air.

Thus, the modulated ultrasound signal may in the system of FIG. 3 be given by $$s\ (t)=\Re\,(E(t)\exp(jH\,[ln\{E(t)\}])\sin(\omega_c t)+\Im(E(t)\exp(jH\,[ln\{E(t)\}])\cos(\omega_c t)$$

The approach may thus provide an SSB modulation of a parametric signal which not only may lead to improved audio quality but which also can be implemented with low complexity and computational resource requirements. Indeed, one of the more complex operations is the Hilbert transform but it should be noted that this can be implemented using a relatively short filter as the parametric loudspeaker effectively operates over a limited audio bandwidth of say 800 Hz to 15 kHz. Obviously the frequency response of the Hilbert transform can be extended at the expense of extra computational load.

A significant advantage of the described approach is that the relationship between the pre-compensated envelope signal E(t) and the radiated envelope is known, and thus that the relationship between the pre-compensated envelope signal E(t) and the demodulated audio is known. This allows an effective pre-compensation.

In the example, the distortion caused by the in-air demodulation is assumed to correspond to the theoretical distortion predicted by Berktay's far-field solution, i.e. to:

$$y(t)=\frac{\partial^2}{\partial t^2}(E(t)^2)$$

However, it will be appreciated that in other embodiments, the pre-compensation may be based on an assumption of other distortion functions. These functions may be theoretically derived or may e.g. be determined from measurements of specific audio environments.

The pre-compensator 305 is accordingly arranged to compensate for this distortion. An advantage of the current approach is that it may allow this pre-compensation to follow the approach used for DSB systems. Thus, although a completely different modulation approach is used, it is in this way possible to use similar pre-compensation and furthermore to avoid the need for e.g. recursive techniques to find a suitable compensated function that reflects specific envelope effects of the SSB modulation.

Therefore, in the example, the pre-compensator 305 seeks to compensate for the in-air distortion predicted by Berktay and accordingly it includes a double integrator 319 applied to the input signal x(t). This function can be seen to act as a linear equalization operation to offset the effects of the double differentiation operation occurring during demodulation of the signal in the air.

A summer 315 adds a suitable DC offset (e.g. a value of 1) to the result from the double integrator 319. A square root block then applies a square root function to generate the pre-compensated envelope signal E(t).

Thus, the pre-compensator 305 (approximately) generates the signal $$E(t)=\sqrt{1+\iint x(t)}$$

This may provide a high audio quality even when using SSB (or suppressed sideband) modulation and may in the ideal case provide perfect compensation for the demodulation distortion effects.

The system of FIG. 3 accordingly provides a method of creating an SSB driving signal for a parametric loudspeaker. The pre-processing scheme provides potentially ideal distortion reduction based on Berktay's far-field approximation of the parametric loudspeaker. Additionally the bandwidth of the SSB driving signal does not exceed the bandwidth of the input audio signal. Thus, the approach is spectrally very efficient and provides all the advantages of using SSB. Furthermore, the scheme represents only a modest increase in the needed processing power when compared to simple DSB pre-compensation, and is approximately an order of magnitude less computationally demanding than prior art SSB distortion reduction schemes. This may allow real time, low cost SSB modulation to be applied in practical parametric loudspeaker implementations.

In many embodiments, it may be advantageous to suppress or remove the negative frequencies and thus the LSB. This may particularly be advantageous as it can ensure that no (significant) components of the modulated ultrasound signal approach or fall in the audio band and may thus mitigate the disadvantages associated therewith. Furthermore, it may allow the carrier frequency to be reduced and may specifically allow the carrier frequency to be reduced to frequencies relatively close to the audio band.

However, it will be appreciated that in some embodiments, it may be advantageous to suppress or remove the positive frequencies and thus the USB. For example, in order to fully utilize the bandwidth of the ultrasound transducer, it may be desirable to position the carrier frequency towards one of the ends of the frequency range supported by the ultrasound transducer. In some cases, it may be desirable to remove the carrier frequency as far from the audio band as possible, and it may therefore be advantageous to locate the carrier frequency towards the upper frequency supported by the ultrasound transducer. Such an approach may indeed be feasible by removing the USB and using LSB SSB modulation.

In some embodiments the specific transfer characteristic of the ultrasound transducer may be such that to maximally exploit a resonance frequency, for maximum efficiency, and to maintain a linear, or maximally efficient, regime of operation, it is advantageous to suppress the USB and use the LSB SSB modulation. For example if the transfer function of the ultrasonic transducer demonstrates a sharp reduction in efficiency for frequencies greater than the resonance frequency and a more gentle reduction in efficiency below the resonance frequency it may be desirable to use LSB SSB to maximally exploit the most efficient region of the transducer transfer function. Likewise a scheme utilizing USB SSB can be employed if the transducer transfer function is contrary to the above example.

In some embodiments, the double integrator 319 of the pre-compensator 305 may be implemented as a low pass filter. Indeed, the integration can be modeled as a simple linear filter, and can be performed either digitally or by analogue signal processing. The integration is equivalent to a linear filter proportional to $(1/\omega)^2$, i.e. with a 12 dB per octave roll off towards the high frequencies. The amplitude response of the integration filter may be given by:

$$H(\omega)=1/\omega^2.$$

In theory applying this filter would result in a demodulated audio signal with a flat frequency response from DC to the highest audio frequencies. In practice it is not feasible to perform equalization over the whole audio spectrum. This would require transmission of dangerously high levels of ultrasound to achieve usable amplitudes of audio. The necessary transmission levels would also exceed the physical limits of the amplifier and transducer.

Therefore, the integration and thus low pass filtering may be restricted to frequencies above a given lower limit $\omega_{fc}$. In particular, the double integrator 319 may correspond to a low pass filter having a 3 dB cut off frequency which is in the frequency interval from 200 Hz to 2 kHz. In many embodiments, an advantageous performance is particularly found when the cut-off frequency is in the frequency interval from 400 Hz to 1 kHz.

For example, the filter may be given by:

$$H(\omega)=\begin{cases}1, & \omega<\omega_{fc}\\ \frac{\omega_{fc}^2}{\omega^2}, & \omega\geq\omega_{fc}.\end{cases}$$

The gain of the filter below $w_{fc}$ may simply be unity, i.e. below the selected cut-off frequency $w_{fc}$ the output of the audio may not be compensated. Thus, for frequencies below the frequency, the audio may roll off with a 12 dB per octave slope.

Selecting a low frequency limit $\omega_{fc}$ for the integration (corresponding to a low frequency limit for the compensation of the demodulation distortion) allows the levels of transmitted ultrasound to be reduced, but may in return sacrifice some low frequency extension of the device. For every doubling of the low frequency limit (e.g. from 400 to 800 Hz), the ultrasound intensity can be reduced by 12 dB for a given in band audio sound pressure level. The low frequency limit is influenced by several pertinent criteria: the maximum permissible ultrasound sound pressure level, the desired audio sound pressure level, the area of the transducer, the available headroom in the signal processing and the amplifier, and transducer power limitations.

In some embodiments, the low-pass filter of the double integrator 319 may be combined with a high pass filter, thereby effectively making the combination equivalent to a band pass filter. For example, a high pass filter with a −3 dB point at, say, 800 Hz may be combined with a low pass filter with −3 dB point at, say, 1 kHz. Using the high pass filter provides headroom in the processing and the amplification. In particular, in the absence of a high pass filter the low frequency energy is still rendered with a nominal 0 dB gain. This sound is rendered despite not being audible or indeed being distorted due to the lack of the compensation resulting in demodulation with a 12 dB slope. Typical values for a 3 dB cut-off frequency of the high pass filter may often advantageously be no more than 400 Hz, 200 Hz or 100 Hz from the 3 dB cut off frequency of the low-pass filter.

In the example of FIG. 3, a fixed offset of 1 is added to the double integrator 313 output to ensure that the input to the square root block 317 is not negative. This is done in order to ensure that the pre-compensated envelope signal E(t) is real and positive. The offset of 1 may typically be suitable for normalized input signals with no DC component and bounded such that $-1\leq x(t)\leq 1$.

However, in many embodiments it may be advantageous to dynamically adjust the offset. In particular, it may typically be advantageous to adjust the offset in response to a signal level for the input audio signal. For example, the pre-compensator 305 may include an envelope detector which detects the instantaneous envelope of the input signal and the offset may be set dependent on this. Specifically, for low envelope values, the offset may be reduced and for high envelope values it may be increased.

Indeed, whereas using a fixed value reduces complexity, it also has associated disadvantages. In particular, for the example of FIG. 3 even when no audible sound is output, the transmitted ultrasound will be at a level approximately 0.5 times the maximum output level. This results in inconvenience and increased power consumption. Therefore it is desirable to use a dynamic variable e(t) rather than the fixed value. If e(t) is made to vary with the overall amplitude of the input signal, the transmitted ultrasound level can be minimized, reducing power consumption. The modified envelope function becomes $E(t)=\sqrt{e(t)+\iint x(t)}$. A point of note is that the dynamic variable results in a modification of the modulation envelope. Ordinarily this would result in creation of additional demodulation terms. However, as long as e(t) varies slowly in time, the envelope modification occurs at frequencies too low to be reproduced by the parametric loudspeaker. Any additional demodulation terms are reproduced at too low a level to become audible and no noticeable distortion is introduced. One possible choice for the dynamic variable is to set e(t) equal to the instantaneous envelope function of the input audio signal. This ensures that the signal remains positive while the total amplitude of the ultrasonic signal is reduced.

In the example, the sideband suppressor 307 applies a natural logarithmic function to the pre-compensated envelope signal E(t). However, the natural logarithm operation quickly expands towards −∞for E(t) approaching 0. To prevent this causing computational problems, the pre-compensated envelope signal E(t) may be restricted to have a signal value above a minimum value. For example, a small offset can be applied to ensure E(t) is always above a minimum value, such as e.g. 0.01.

Figure 5:
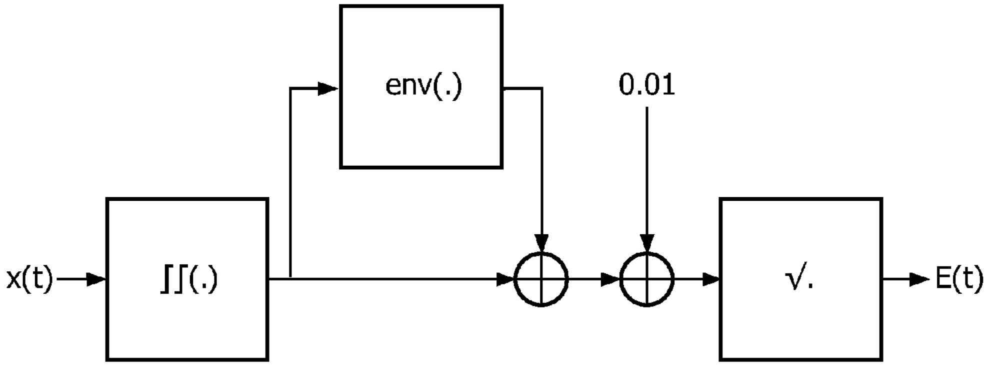
FIG. 5 illustrates an example of elements of a pre-compensator for a parametric loudspeaker system in accordance with some embodiments of the invention.

FIG. 5 may illustrate an example of the resulting pre-compensator 305.

It will be appreciated that the various functionality may be implemented as analog or digital circuitry including e.g. as a digital signal processing in a Digital Signal Processor. In other embodiments, the entire system may be implemented using analogue circuitry.

However, in many embodiments at least some of the functionality is implemented in the digital domain whereas the ultrasound transducer is driven in the analog domain. Accordingly, the system comprises Digital-to-Analog (D/A) converter at some stage in the processing path. The exact position of the D/A converter, and thus the transition from the digital to the analog domain, will depend on the specific preferences and requirements of the individual embodiment.

However, one of the most significant factors to consider is the relative sampling frequency for the signal processing and the conversion rate of the D/A converter.

In particular, the intermediary complex base band signal n(t) in principle contains an infinite spectrum due to the previous square root block. However, the quadrature summation in the modulator 309 reduces the bandwidth of the signal s(t) to correspond to one sideband, i.e. to correspond to the bandwidth of the input audio signal. The sample frequency must therefore preferably be high enough to prevent significant aliasing artefacts occurring when processing the intermediary signal n(t). However, there are a number of factors which may tend to reduce this requirement. Firstly, whereas the square root operation introduces an infinite harmonic sequence, the higher order harmonics roll off at a 12 dB per octave. The double integrator 319 also introduces a 12 dB per octave suppression of the high frequencies which means in practise at some high frequency cut off $f_{ch}$, the amplitude of the signal falls below the noise floor. In addition, it seems that aliasing of the harmonics may often not degrade the operation unacceptably, and indeed the subsequent quadrature modulation may also remove some of the aliasing components. Hence, the signal processing may require a relatively high yet not unreasonable sample frequency. In many embodiments, the sample frequency may advantageously be less than 300 kHz or indeed even less than 200 kHz. For example, advantageous performance has been achieved with a sample frequency of 192 kHz.

However, such a sample frequency is still relatively high compared to the audio signal bandwidth and the typical ultrasound carrier frequencies of 10-15 kHz. Thus, whereas it is possible, and in some embodiments advantageous, to perform the quadrature modulation in the analogue domain this would involve converting the complex base band signal n(t) into a quadrature analogue signal. The A/D converters would accordingly need to cover a large bandwidth and would need to operate at a high conversion frequency. However, if the quadrature modulation is performed in the digital domain, the resulting modulated signal s(t) has a substantially lower bandwidth and lower maximum frequency. Thus, in this case the D/A converters need only cover the range from fc to fc+$W_x$ where fc is the ultrasound carrier frequency and $W_x$ is the bandwidth of the audio signal. Accordingly, it will typically be advantageous to perform the modulation in the digital domain. Accordingly, in the example, the functionality of the pre-compensator 305, the sideband suppressor 307 and the modulator 309 is implemented as digital signal processing with the output circuit 311 comprising the D/A converter.

Furthermore, such an approach allows a single D/A converter operation to be used for each sample instant whereas a conversion of the complex base band signal n(t) would typically require two conversions for each same instant, namely one for each of the real and imaginary parts.

Most practical ultrasound transducers do not possess a flat frequency response. However, for the distortion reduction pre-processing to be most effective, the frequency response should preferably be flat within the needed ultrasonic pass band. Accordingly, the output circuit may comprise an equalization filter matched to the ultrasound transducer. This filter can be created by measuring the frequency response of the transducer and then using an inversion procedure to design a suitable equalization filter.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An apparatus for generating a drive signal for a parametric loudspeaker, the apparatus comprising:
 a receiver for receiving an input audio signal;
 a pre-compensator for generating a pre-compensated envelope signal by applying a pre-compensation to the input audio signal, the pre-compensation at least partially compensating an envelope distortion of in-air demodulation of a modulated ultrasound signal;
 a first circuit for generating a complex base band signal, the first circuit being arranged to:
 generate a phase signal from the pre-compensated envelope signal in response to a predetermined function for determining a phase signal from an amplitude signal, the predetermined function generating a phase signal corresponding to a complex signal wherein a first frequency range of a first group consisting of a first range corresponding to positive frequencies and a second range corresponding to negative frequencies is suppressed relative to the other frequency range of the first group; and
 generate the complex base band signal with an amplitude corresponding to the pre-compensated envelope signal and a phase corresponding to the phase signal;
 a modulator for quadrature modulating the complex base band signal on an ultrasonic quadrature carrier to generate a modulated signal; and
 an output circuit for driving an ultrasound transducer from the modulated signal.

2. The apparatus of claim 1 wherein the first circuit comprises a Hilbert filter.

3. The apparatus of claim 2 wherein the first circuit comprises a circuit for applying a logarithmic function to the pre-compensated envelope signal prior to the Hilbert filter.

4. The apparatus of claim 3 wherein the first circuit is arranged to determine the phase signal substantially as:

$$\phi(t)=H(ln(E(t)))$$

where In(x) is the natural logarithm of x, H(x) is the Hilbert transform, E(t) is the pre-compensated envelope signal and t is a time variable.

5. The apparatus of claim 1 wherein the first frequency range is the first range corresponding to positive frequencies.

6. The apparatus of claim 1 wherein the first frequency range is the second range corresponding to negative frequencies.

7. The apparatus of claim 1 wherein no less than 90% of an energy of the complex base band is in the other frequency range.

8. The apparatus of claim 1 wherein the pre-compensator comprises a double integrator for compensating the input audio signal.

9. The apparatus of claim 8 wherein the double integrator corresponds to a low pass filter having a 3 dB cut off frequency in a frequency interval from 200 Hz to 2 kHz.

10. The apparatus of claim 8 wherein the pre-compensator further comprises:
 an offset generator for applying an offset to an output of the double integrator to generate an offset signal; and
 a modifier for generating the pre-compensated envelope signal by applying a square root function to the offset signal.

11. The apparatus of claim 10 wherein the offset generator is arranged to dynamically determine the offset in response to a signal level for the input audio signal.

12. The apparatus of claim 1 wherein the pre-compensator is arranged to restrict the pre-compensated envelope signal to have a signal value above a minimum value.

13. The apparatus of claim 1 wherein the pre-compensator the first circuit and the modulator are implemented as digital signal processing and the output circuit comprises a digital-to-analog converter.

14. A parametric loudspeaker system comprising:
 an apparatus according to claim 1; and
 the ultrasound transducer.

15. A method of driving a parametric loudspeaker, the method comprising:
 receiving an input audio signal;
 generating a pre-compensated envelope signal by applying a pre-compensation to the input audio signal, the pre-compensation at least partially compensating an envelope distortion of in-air demodulation of a modulated ultrasound signal;
 generating a complex base band signal by:
 generating a phase signal from the pre-compensated envelope signal in response to a predetermined function for determining a phase signal from an amplitude signal, the predetermined function generating a phase signal corresponding to a complex signal wherein a first frequency range of a first group consisting of a first range corresponding to positive frequencies and a second range corresponding to negative frequencies is suppressed relative to the other frequency range of the first group; and
 generating the complex base band signal with an amplitude corresponding to the pre-compensated envelope signal and a phase corresponding to the phase signal;
 quadrature modulating the complex base band signal on an ultrasonic quadrature carrier to generate a modulated signal; and
 driving an ultrasound transducer from the modulated signal.

* * * * *